Patented Mar. 21, 1933

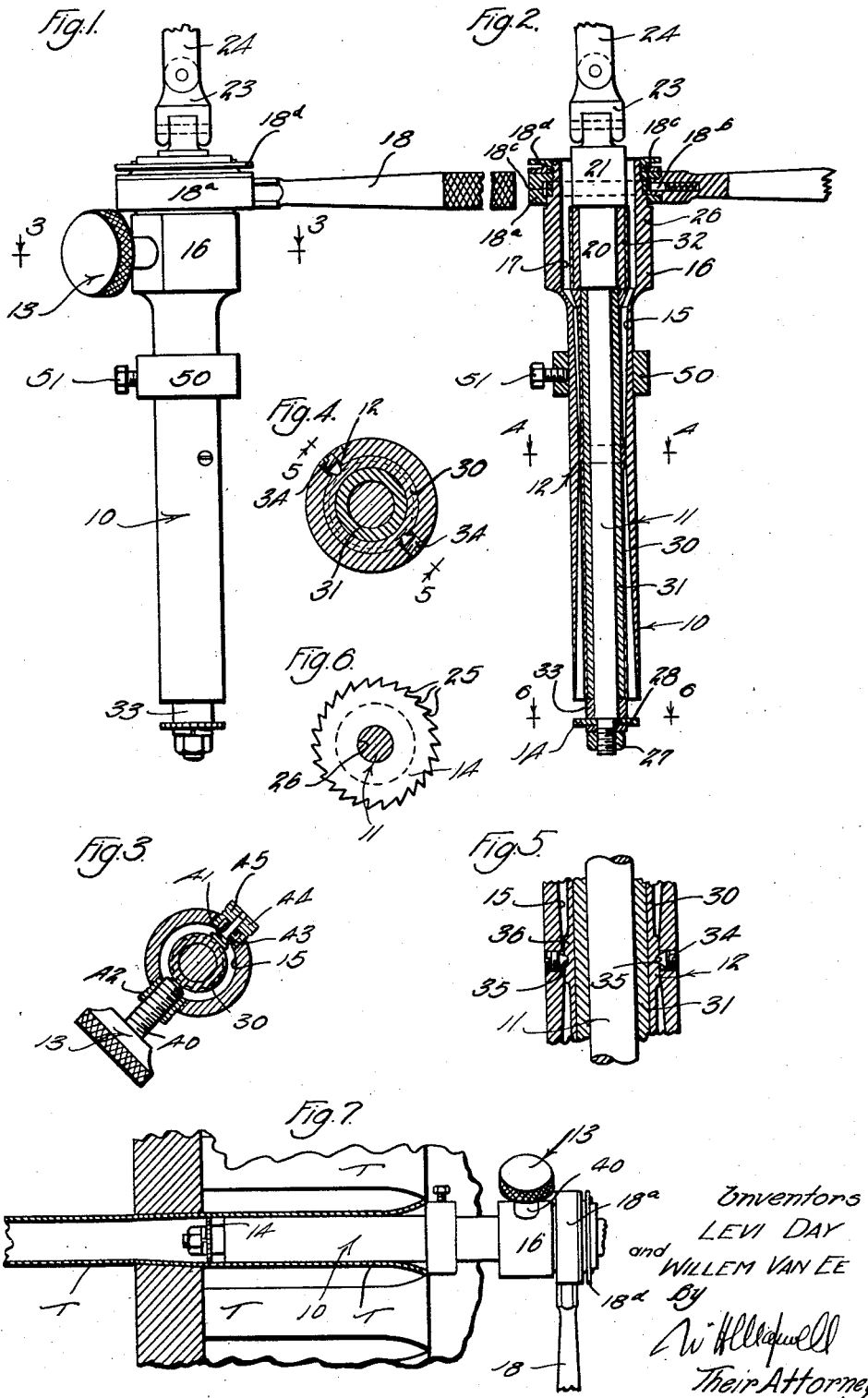

1,902,355

UNITED STATES PATENT OFFICE

LEVI DAY AND WILLEM VAN EE, OF LONG BEACH, CALIFORNIA

TUBING CUTTER

Application filed June 27, 1930. Serial No. 464,282.

This invention relates to a pipe or tubing cutter and it is a general object of the invention to provide a simple, practical, and effective device particularly adapted for cutting the pipe or tubing of boilers, condensers, etc.

It is sometimes necessary to cut the flues or tubes of boilers, condensers, and the like, so that they may be repaired or removed. Boilers and condensers are commonly constructed with the tubes arranged close together in banks so that it is extremely difficult to reach an individual tube to work on it or cut it. Tubing cutters adapted to be inserted in a tube to cut outwardly through the tube have been proposed and used. The usual type of tubing cutter for the use mentioned usually embodies several blades or cutters and wedge means for forcing the cutters outwardly against the inner walls of the tubing, the cutting action being obtained by rotating the entire tool so that the cutters are operated relative to the tube to be cut.

An object of this invention is to provide a tube cutting device having a cutter adapted to be inserted in a tube and embodying improved means for feeding or operating the cutter outwardly to cut through the walls of the tube.

It is another object of the invention to provide a tool of the character mentioned which embodies a rotatable cutter to be inserted in a tube that is mounted on a pivoted shaft operable to feed the cutter outwardly through the tube.

It is another object of the invention to provide a tubing cutter that is simple and convenient to operate and which may be operated or driven by any suitable power or drive means.

Another object of the invention is to provide a tubing cutter for cutting outwardly through the tubing that makes a smooth, even, annular cut in the tubing. The cutter provided by this invention will effectively and rapidly cut through a tube without expanding it or leaving an undesirable flange at the cut.

It is a further objection of the invention to provide a tubing cutter that is of simple construction and which is particularly convenient to operate in a confined or restricted place.

Other objects and features of our invention will be best and more fully understood from the following detailed description of a typical form and application of the invention, throughout which description reference is had to the accompanying drawing, in which:

Fig. 1 is a side elevation of the tubing cutter provided by the present invention. Fig. 2 is a longitudinal detailed sectional view of the device. Fig. 3 is a transverse detailed sectional view taken as indicated by line 3—3 on Fig. 1. Fig. 4 is an enlarged transverse detailed sectional view taken as indicated by line 4—4 on Fig. 2. Fig. 5 is a longitudinal detailed sectional view of a portion of the tool, being a view taken as indicated by line 5—5 on Fig. 4. Fig. 6 is a side elevation of the cutter, being a view taken substantially as indicated by line 6—6 on Fig. 2, and Fig. 7 is a view illustrating the tubing cutter in operating position in a condenser tube.

The tubing cutter provided by the present invention is suitable for use in various situations where it is desired to cut pipe or tubing. The tool is particularly suited for use where is is difficult or impossible to reach the exterior of a tube or pipe to cut through it. For example, the tool is particularly useful in cutting the tubes of boilers, condensers, or the like. Throughout the following detailed disclosure a simple form of the invention suited for use in cutting boiler or condenser tubes will be described. In the drawing the device is illustrated in operating position in a condenser tube T. The particular device illustrated is designed and proportioned to be adapted for use in cutting the flared outwardly projecting intake end of a condenser tube T. It is to be understood that the invention is not to be construed as limited to the particular form illustrated in the drawing or to the particular uses referred to, but that it is to be taken as including any features or modifications that may fall within the scope of the claims.

The tube cutting device provided by the present invention includes, generally, a tubular body 10, a cutter shaft 11 extending freely through the body 10 and carrying a cutter 14, means 12 for rotatably and tiltably mounting the shaft 11 in the body, and means 13 for tilting the shaft 11 to operate or feed the cutter 14 radially outward against the interior of the tube.

The body 10 is an elongated tubular member having a central longitudinal opening 15 for carrying or passing the cutter shaft 11. The body 10 is preferably round in cross sectional configuration and is adapted to be inserted in a condenser tube T, or the like. The outer end of the body 10 is provided with an enlargement or head 16 and the portion 17 of the opening 15 passing through the head may be enlarged or of greater diameter than the main portion of the opening 15. The enlarged portion 17 of the body opening provides an outwardly facing shoulder which may be beveled as clearly illustrated in Fig. 2 of the drawing. The opening 15 of the body is flared outwardly in opposite directions from a point substantially midway between the opposite ends of the body; that is, the walls of the opening 15 are gradually outwardly divergent in opposite directions from a point approximately midway between the opposite ends of the body.

A handle 18 may be provided on the head 16 to facilitate handling and operating the tool. The handle 18 may project radially outward from the head 16. The handle 18 may be in the nature of a ratchet handle and may have a sleeve 18ª at its inner end rotatable on the head 16. A spring pressed pawl 18ᵇ is provided on the handle to cooperate with ratchet teeth 18ᶜ on the head 16. The handle may be retained on the head 16 by means of a collar 18ᵈ at the outer end of the head.

The cutter carrying the shaft 11 is arranged through the opening 15 in the body and is tiltably and rotatably mounted in the opening by the means 12. The shaft 11 extends completely through the body 10 and projects from the inner end of the body where it carries the cutter 14 and projects from the outer end of the body where it is adapted to be connected with a suitable drive or operating means. The shaft 11 may be driven or rotated in any suitable manner. For example, it may be driven by means of an electrically-operated drilling machine, or the like.

The shaft 11 is considerably smaller in diameter than the opening 15 and is centrally or axially arranged in the opening. The outer portion of the shaft 11 may be stepped to have an enlargement 20 in the enlarged portion 17 of the body opening and a second enlargement or head 21 at the outer end of the body 10. The shaft 11 with its enlargement 20 is proportioned so that there is a substantial annular space between its exterior and the walls of the body opening 15. In the drawing a flexible connection 23 is illustrated connecting the cutter shaft 11 with the drive shaft 24. The flexible connection 23 is such that the shaft 11 may be operated or rotated through the shaft 24 and is free to be swivelled or tilted in various directions relative to the drive shaft 24.

The cutter 14 is mounted on the inner end of the shaft 11 projecting from the inner end of the body 10. The cutter 14 is preferably annular or in the form of a disk and is provided at its periphery with teeth or cutting parts 25. The cutter 14 is provided with a central opening 26 passing a reduced inner end portion of the shaft 11 and may be detachably retained on the shaft by a nut 27 threaded on the end of the shaft. The nut 27 may clamp the cutter 14 against an outwardly facing shoulder 28 on the shaft 11. The cutter 14 is preferably spaced a short distance beyond the inner end of the body 10. The cutter 14 is of slightly less diameter than the opening of the tube 10 so that it may be readily inserted in the tube.

The means 12 mounts the cutter shaft 11 in the opening 15 of the body so that it may be rotated to operate the cutter 14 and may be tilted relative to the central longitudinal axis of the body to bring the cutter into engagement with the interior of the tube T. The means 12 includes a tubular shell 30 passing the shaft 11 and pivotally mounted within the body 10 and bushings 31 and 32 rotatably supporting the shaft 11 in the shell 30. The shell 30 is axially and longitudinally arranged in the opening 15 and preferably extends the entire length of the body 10. The shell 30 has a greater internal diameter than the diameter of the shaft 11 so that it is adapted to carry the bushings 31 and 32 for rotatably carrying the shaft. The bushing 31 is arranged in the shell 30 to rotatably support the main portion of the shaft 11 and the bushing 32 is arranged in the shell 30 to carry the enlargement 20. The outer portion of the shell 30 is enlarged to carry the bushing 32. The bushing 32 is arranged between the end of the head 21 and a shoulder in the shell 30 provided by the outer enlarged end of the shell. The bushing 31 is held against longitudinal displacement from the shaft by the enlargement 20 at its outer end and a spacer bearing 33 at its inner end.

The shell 30 is of less diameter than the flared or divergent body opening 15 so that there is an annular space provided between the walls of the opening and the exterior of the shell. The shell 30 is pivotally mounted in the body so that it is tiltable to cause the cutting parts of the cutter to be brought into engagement with the interior of the tube T. The shell 30 is mounted in the opening 15 to pivot about a transverse axis located substantially midway between the opposite ends of the body or at the portion of the opening 15 having the smallest diameter. The shell 30 is pivotally mounted in the body 10 on set screws 34 or pivot pins threaded through diametrically opposite openings in the wall of the body 10 and engaging the shell 30. The inner ends of the rocker pins or screws 34 are rounded or spherical and seat in sockets 35 provided in an annular enlargement 36 on the exterior of the shell 30. The screws 34 support the shell 30 in the body 10 so that the shell 30 and shaft 11 may be tilted bodily within the body 10 and the bushings and the shell rotatably carry the shaft 11 so that the shaft 11 may be tilted while it is rotating to feed the cutter 14 outwardly through the walls of the tube T. The walls of the body opening 15 being outwardly divergent from the pivotal mounting of the shell allow a maximum tilting of the shell and shaft 11.

The means 13 for tilting the shaft 11 to operate or force the cutter 14 against the inner walls of the tube T includes a screw 40 in the enlargement 16 to engage the shell 30 and a spring-pressed member 41 to engage the shell 30 at a point diametrically opposite the screw 40 to return the shell 30 and shaft 11 to an axial position after actuation of the tool. The screw 40 is threaded through a collar 42 arranged in a transverse opening in the wall of the enlargement 16 and its end is adapted to engage the exterior of the shell 30. The member 41 is mounted on the body 10 to return the shell and shaft 11 to the central position to retract the cutter 14 after actuation and operates to eliminate vibration of the shell and shaft during operation of the tool. The member 41 engages the shell 30 at a point diametrically opposite the screw 40 and is yieldingly urged against the shell by a spring 43 reacting against a plug or set screw 44. The set screw 44 may be threaded into a tubular insert 45 in an opening in the enlargement 16. It will be obvious that the action of the centralizing member 41 may be adjusted by threading the set screw 44 through the insert 45.

In accordance with the preferred form of the invention means is provided on the body 10 for engaging the end of a tube or pipe to limit the extent of inward movement of the body in the tube so that the cutter may be arranged in the desired position in the tube. In the form of the invention illustrated in the drawings a gauging collar 50 is slidably mounted on the exterior of the body 10. The collar 50 is proportioned to engage the flared end of a condenser tube T, or the like. The collar 50 may be releasably set in various positions on the body 10 by a set screw 51.

It is believed that the operation and utility of the tool provided by the present invention will be readily apparent from the foregoing detailed description. In employing the device the body 10 is inserted in the tube T with the shell 30 and shaft 11 in a central or axial position so that the cutter 14 readily passes into the tube. The collar 50 may be set on the body 10 to limit the inward movement of the body to properly position the cutter where it is desired to make the cut. The shaft 11 may be driven or rotated and the screw 40 may be operated or threaded into the part 42 to tilt the shell 30 and shaft 11. Upon tilting of the shaft 11 the cutter 14 is forced outwardly into cutting engagement with the interior of the tube T. The body 10 may be bodily rotated by means of the handle 18 to cause the cutter 14 to make an annular cut through the wall of the tube T. After actuation of the tool the screw 40 may be retracted, and the member 41 operates to automatically return the shaft 11 and cutter to the normal or axial position. It is to be noted that the invention provides a simple and effective means for mounting a cutter shaft of a tube cutting device. The tubing cutter may be effectively operated in tubes or pipes that are corroded and weakened as the cutter is fed outwardly without reaction of the tool against the interior of the tube.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. A tubing cutter including, a body adapted to be inserted in a tube and having a longitudinal opening, a shaft extending through the opening, means for rotatably and tiltably mounting the shaft in the opening including, a shell rotatably carrying the shaft and tiltably mounted in the opening, a cutter on the shaft, a screw on the body operable to engage the shell to tilt the shell and shaft to feed the cutter outwardly, and spring means for automatically tilting the shell to a normal axial position upon retraction of the screw.

2. A tubing cutter including, a body adapted to be inserted in a tube and having a longitudinal opening, a shaft extending through the opening, means for rotatably and tiltably mounting the shaft in the opening including, a shell rotatably carrying the shaft and tiltably mounted in the opening, a cutter on the shaft, a screw on the body operable to engage the shell to tilt the shell to feed the cutter outwardly, and means for returning the shell to a normal substantially axial position including a spring pressed member in the opening engaging the shell.

3. A tubing cutter including a body adapted to be inserted in the tube to be cut, the body having a longitudinal opening flared outwardly in both directions from a point intermediate its ends, a tubular bushing arranged longitudinally in said opening, means mounting the bushing in the opening adjacent said point to pivot about an axis diametric of the opening, a cutter shaft rotatable in the bushing, and means for tilting the bushing.

4. A tubing cutter including a body adapted to be inserted in the tube to be cut, the body having a longitudinal opening flared outwardly in both directions from a point intermediate its ends, a tubular bushing arranged longitudinally in said opening, means mounting the bushing in the opening adjacent said point to pivot about an axis diametric of the opening, the bushing tapering longitudinally outward toward each end from its pivotal mounting, a cutter shaft rotatable in the bushing, and means for tilting the bushing.

In witness that we claim the foregoing we have hereunto subscribed our names this 5th day of June, 1930.

LEVI DAY.
WILLEM van EE.